United States Patent
Kobayashi et al.

(10) Patent No.: US 12,450,309 B2
(45) Date of Patent: Oct. 21, 2025

(54) STORAGE MEDIUM, INFORMATION PROCESSING DEVICE, AND TRAINING PROCESSING METHOD

(71) Applicant: FUJITSU LIMITED, Kawasaki (JP)

(72) Inventors: Ken Kobayashi, Setagaya (JP); Yuhei Umeda, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 721 days.

(21) Appl. No.: 17/895,121

(22) Filed: Aug. 25, 2022

(65) Prior Publication Data
US 2022/0405526 A1  Dec. 22, 2022

Related U.S. Application Data

(63) Continuation of application No. PCT/JP2020/008681, filed on Mar. 2, 2020.

(51) Int. Cl.
| | |
|---|---|
| G06F 18/211 | (2023.01) |
| G06F 18/2113 | (2023.01) |
| G06F 18/214 | (2023.01) |
| G06F 18/22 | (2023.01) |
| G06F 18/40 | (2023.01) |

(52) U.S. Cl.
CPC ...... *G06F 18/2113* (2023.01); *G06F 18/2155* (2023.01); *G06F 18/22* (2023.01); *G06F 18/40* (2023.01)

(58) Field of Classification Search
None
See application file for complete search history.

(56) References Cited

U.S. PATENT DOCUMENTS

| | | | |
|---|---|---|---|
| 9,275,307 B2* | 3/2016 | Chattopadhyay | ............................ G06V 30/18105 |
| 10,755,164 B2* | 8/2020 | Osogami | ................ G06N 3/047 |
| 10,839,258 B2* | 11/2020 | Todoriki | .................. G06N 7/08 |
| 10,970,631 B2* | 4/2021 | Sim | ........................ G06V 10/82 |

(Continued)

OTHER PUBLICATIONS

"Unsupervised Learning"—Wikipedia, Searched on Feb. 11, 2020 [online] https://en.wikipedia.org/wiki/Unsupervised_learning (Total 4 pages).

(Continued)

*Primary Examiner* — Maikhanh Nguyen
(74) *Attorney, Agent, or Firm* — Fujitsu Intellectual Property Center

(57) ABSTRACT

A storage medium storing a training processing program that causes at least one computer to execute a process that includes acquiring a deviation degree of a feature in a training dataset, by using a determination model, the training dataset being unlabeled; selecting one or more pieces of data included in the training dataset based on the deviation degree; outputting the selected one or more pieces of data or related data related to the selected one or more pieces of data; receiving an input of a determination result by a user for the one or more pieces of data; and determining an adjustment standard used to adjust a feature of each piece of the data included in the training dataset based on the received determination result, wherein when determination target data is determined by the determination model, a feature of the determination target data is adjusted based on the adjustment standard.

17 Claims, 20 Drawing Sheets

(56) References Cited

U.S. PATENT DOCUMENTS

| | | | | |
|---|---|---|---|---|
| 11,017,220 | B2* | 5/2021 | Huang | G06F 18/24 |
| 11,514,329 | B2* | 11/2022 | Jin | G06N 3/088 |
| 2020/0134506 | A1* | 4/2020 | Wang | G06N 3/088 |

OTHER PUBLICATIONS

Kyoko Sudo et al., "Detecting Anomalous Sequences in Long Duration Monitoring Videos", IPSJ SIG Technical Reports, 2005-CVIM-151, vol. 2005, No. 112, ISSN: 0919-6072, pp. 77-82, 2005, Nov. 18, 2005 (Total 8 pages).

Shogo Okada et al., "Image Classification System based on Interaction with Human", Proceedings of the 24th Annual Conference of the Japanese Society for Artificial Intelligence (JSAI), 2010, ISSN 1347-9881, 2G2-OS9-6, pp. 1-4 (Total 5 pages).

International Search Report and Written Opinion of the International Searching Authority (Form PCT/ISA/210, 220, and 237), mailed in connection with PCT/JP2020/008681 and mailed Jun. 30, 2020 (Total 10 pages).

Pimentel, Tiago et al., "A Generalized Active Learning Approach for Unsupervised Anomaly Detection", arxiv.org, Cornell University Library, 201 Olin Library Cornell University Ithaca, NY 14853, XP080881759, pp. 1-23, May 23, 2018.

Meng, Fangrong et al., "An overview on trajectory outlier detection", Artificial Intelligence Review, Springer Netherlands, NL, vol. 52, No. 4, XP036907839, pp. 2437-2456, Feb. 2, 2018 [retrieved on Feb. 2, 2018].

Barnabe-Lortie, Vincent et al., "Active Learning for One-Class Classification", 2015 IEEE 14th International Conference on Machine Learning and Applications (ICMLA), IEEE, XP032875758, pp. 390-395, Dec. 9, 2015.

Extended European Search Report dated Mar. 1, 2023 for corresponding European Patent Application No. 20923361.8, 10 pages.

* cited by examiner

STORAGE MEDIUM, INFORMATION PROCESSING DEVICE, AND TRAINING PROCESSING METHOD

CROSS-REFERENCE TO RELATED APPLICATION

This application is a continuation application of International Application PCT/JP2020/008681 filed on Mar. 2, 2020 and designated the U.S., the entire contents of which are incorporated herein by reference.

FIELD

The present invention relates to a storage medium, an information processing device, and a training processing method.

BACKGROUND

In recent years, abnormality detection using a determination model generated through machine learning (hereinafter, simply referred to as abnormality detection) has been performed. Such abnormality detection is used in fields, for example, rough road detection based on sensor data of automobiles, visual inspection of products in factories, or the like.

Specifically, in the determination model described above, for example, a feature vector of each piece of data (hereinafter, referred to as determination target data) to be a target of abnormality determination is distributed in a feature space and data, of the determination target data, in which a distance from a feature vector corresponding to data in a normal state is long is specified. Then, in the abnormality detection, each piece of the specified determination target data is detected as data in an abnormal state and is presented to a user (for example, refer to Non-Patent Document 1).

Non-Patent Document 1:
  en.wikipedia.org/wiki/Unsupervised_learning

SUMMARY

According to an aspect of the embodiments, a non-transitory computer-readable storage medium storing a training processing program that causes at least one computer to execute a process, the process includes acquiring a deviation degree of a feature in a training dataset for each piece of data included in the training dataset, by using a determination model that is generated through training by using the training dataset, the training dataset being unlabeled; selecting one or more pieces of data included in the training dataset based on the deviation degree; outputting the selected one or more pieces of data or related data related to the selected one or more pieces of data; receiving an input of a determination result by a user for the one or more pieces of data; and determining an adjustment standard used to adjust a feature of each piece of the data included in the training dataset based on the received determination result, wherein when determination target data is determined by the determination model, a feature of the determination target data is adjusted based on the adjustment standard.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Here, in a case where the determination model described above is generated, there is a case where the user manually labels training data. Therefore, depending on the number of pieces of the training data needed to be labeled, there is a case where man-hours of the user to perform labeling becomes enormous.

Furthermore, the determination model described above, for example, determines a state of each piece of the data by using a distance of the feature vector in the feature space. Therefore, there is a possibility that the determination model described above cannot necessarily detect data in an abnormal state or the like that is implicitly desired by the user.

Therefore, at a determination model training stage, for example, the user performs active training for giving feedback to the training data. Specifically, for example, the user adds a label indicating whether data is data in an abnormal state or not, for a part of the data output from the determination model as the data in the abnormal state, and further performs supervised training by using the labeled data.

As a result, for example, the user can notice existence of the abnormal state that is implicitly desired by the user in a labeling process and can generate a determination model that can detect the data in the abnormal state that is implicitly desired by the user. Furthermore, the user can suppress man-hours needed for labeling.

However, in a case where the active training described above is performed, the user needs to comprehensively grasp the abnormal state of the data needed to be detected, in advance. Therefore, for example, in a case where the user does not fully understand the abnormal state of the data, it is not possible for the user to perform the active training as described above.

Moreover, for example, in a case where regeneration of the determination model is needed due to reasons such as inappropriate design of a creator at a training stage or the like, and there is a case where it is needed to perform works including labeling again and man-hours by the user becomes more enormous.

Therefore, in one aspect, an object of the present invention is to provide a training processing program, an information processing device, and a training processing method that can easily improve a determination model.

According to one aspect, it is possible to easily improve a determination model.

[Configuration of Information Processing System]

Figure 1:
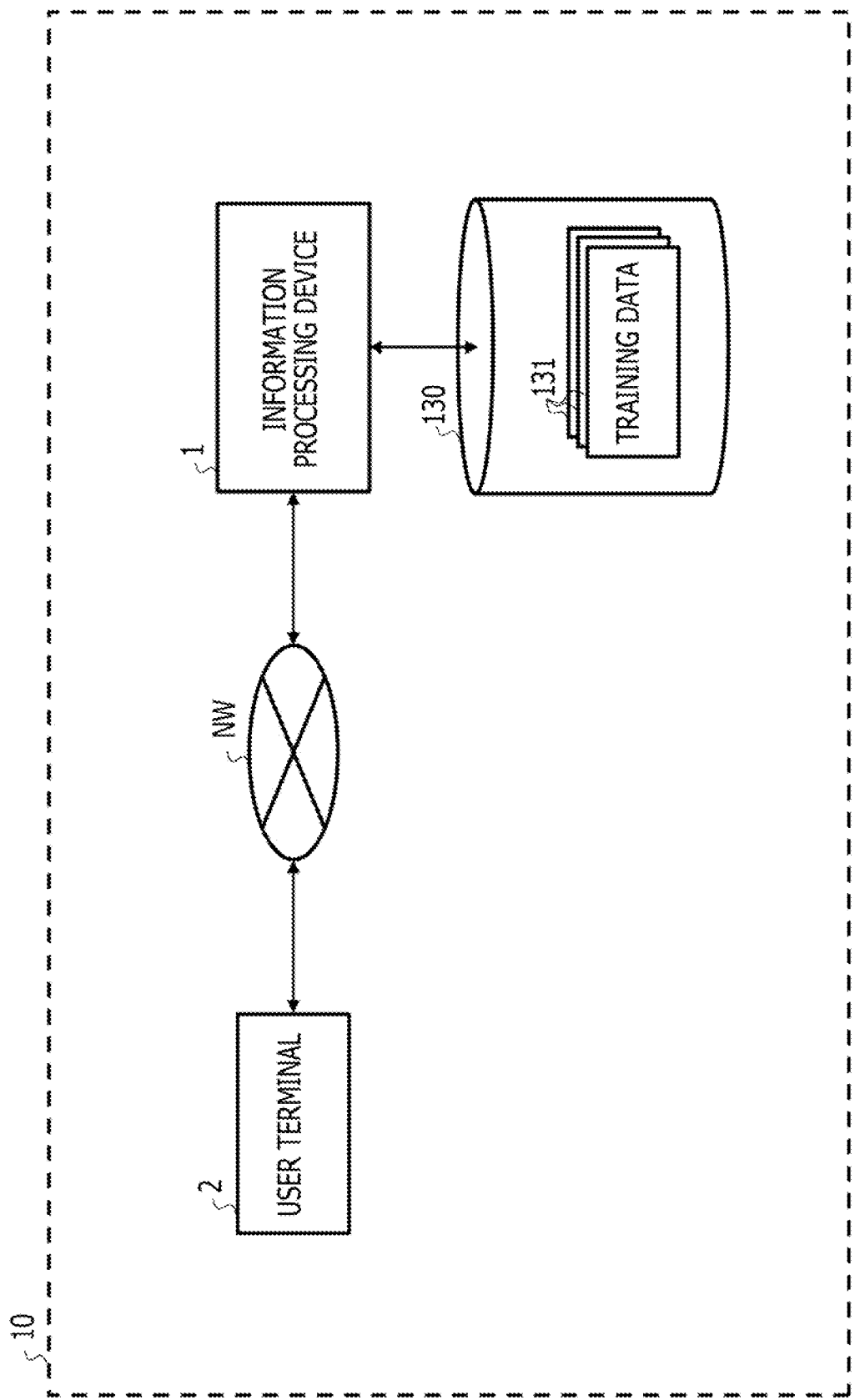
FIG. 1 is a diagram for explaining a configuration of an information processing system 10.

First, a configuration of an information processing system 10 will be described. FIG. 1 is a diagram for explaining the configuration of the information processing system 10.

As illustrated in FIG. 1, the information processing system 10 includes an information processing device 1 and a user terminal 2 to which a user inputs information or the like. The user terminal 2 is, for example, a personal computer (PC) that is used by a user, and is connected via a network NW such as the Internet of the information processing device 1.

Specifically, the user terminal 2 receives an input of training data 131 used to generate a determination model (not illustrated) for abnormality detection, for example. Then, in a case of receiving the input of the training data 131, the user terminal 2 transmits the training data 131 to the information processing device 1.

Note that each piece of the training data 131 may be, for example, each piece of image data included in video data imaged by a camera mounted on an automobile. Furthermore, each piece of the training data 131 may be, for example, each piece of time-series data indicating a change in the video data imaged by the camera mounted on the automobile (time-series data corresponding to video data cut into each predetermined window size).

In a case of receiving the training data 131 transmitted from the user terminal 2, for example, the information processing device 1 stores the received training data 131 in an information storage region 130. Then, the information processing device 1 trains the training data 131 stored in the information storage region 130 at a training stage so as to generate the determination model for the abnormality detection of data.

Thereafter, for example, in a case where determination target data (data in which whether or not data is in an abnormal state is unknown) is input via the user terminal 2 at an inference stage, the information processing device 1 inputs the determination target data into the determination model. Then, the information processing device 1 outputs a value output from the determination model in response to the input of the determination target data as information indicating whether or not the determination target data is data in an abnormal state.

Specific Example of Processing at Determination Model Training Stage

Figure 2:
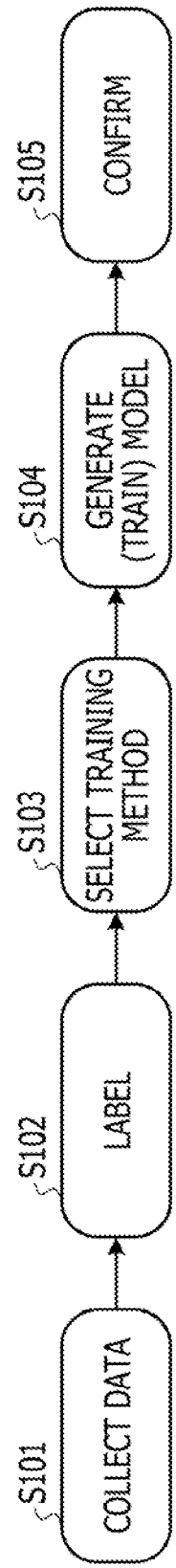
FIG. 2 is a diagram for explaining a specific example of processing at a determination model training stage.

Next, a specific example of processing at a determination model training stage will be described. FIG. 2 is a diagram for explaining the specific example of the processing at the determination model training stage.

As illustrated in FIG. 2, in a case where the determination model described above is generated, the user collects the training data 131 (S101), and then, manually labels the training data 131 (S102). Then, after selecting a training method (S103), the user generates the determination model by using the labeled training data 131 (S104). Thereafter, for example, the user confirms that determination accuracy or the like satisfies a criteria (S105).

Therefore, depending on the number of pieces of the training data 131 needed to be labeled, there is a case where man-hours of the user needed for labeling become enormous.

Furthermore, the determination model described above, for example, determines a state of each piece of the determination target data by using a distance of a feature vector in a feature space at the inference stage. Therefore, there is a possibility that the determination model described above cannot necessarily detect determination target data in an abnormal state that is implicitly desired by the user. Hereinafter, a specific example of the abnormality detection by the determination model will be described.

Specific Example of Abnormality Detection by Determination Model

Figure 3:
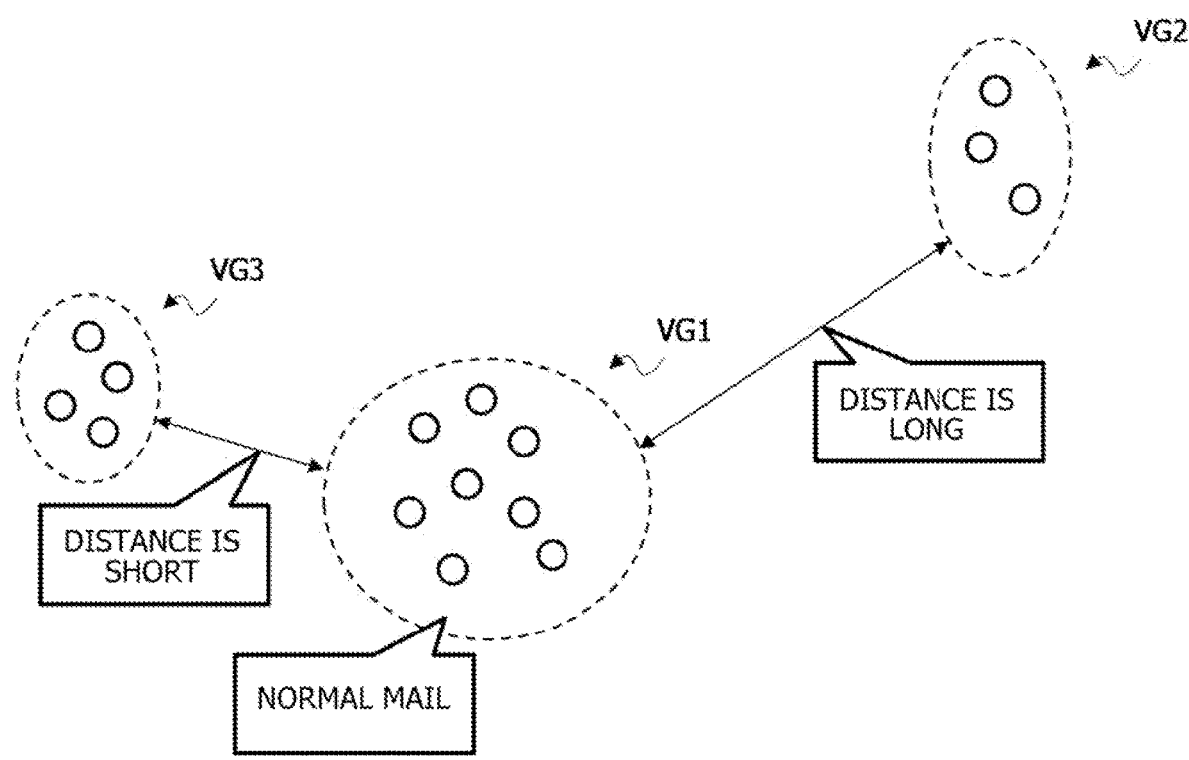
FIG. 3 is a diagram for explaining a specific example of abnormality detection by the determination model.
Figure 4:
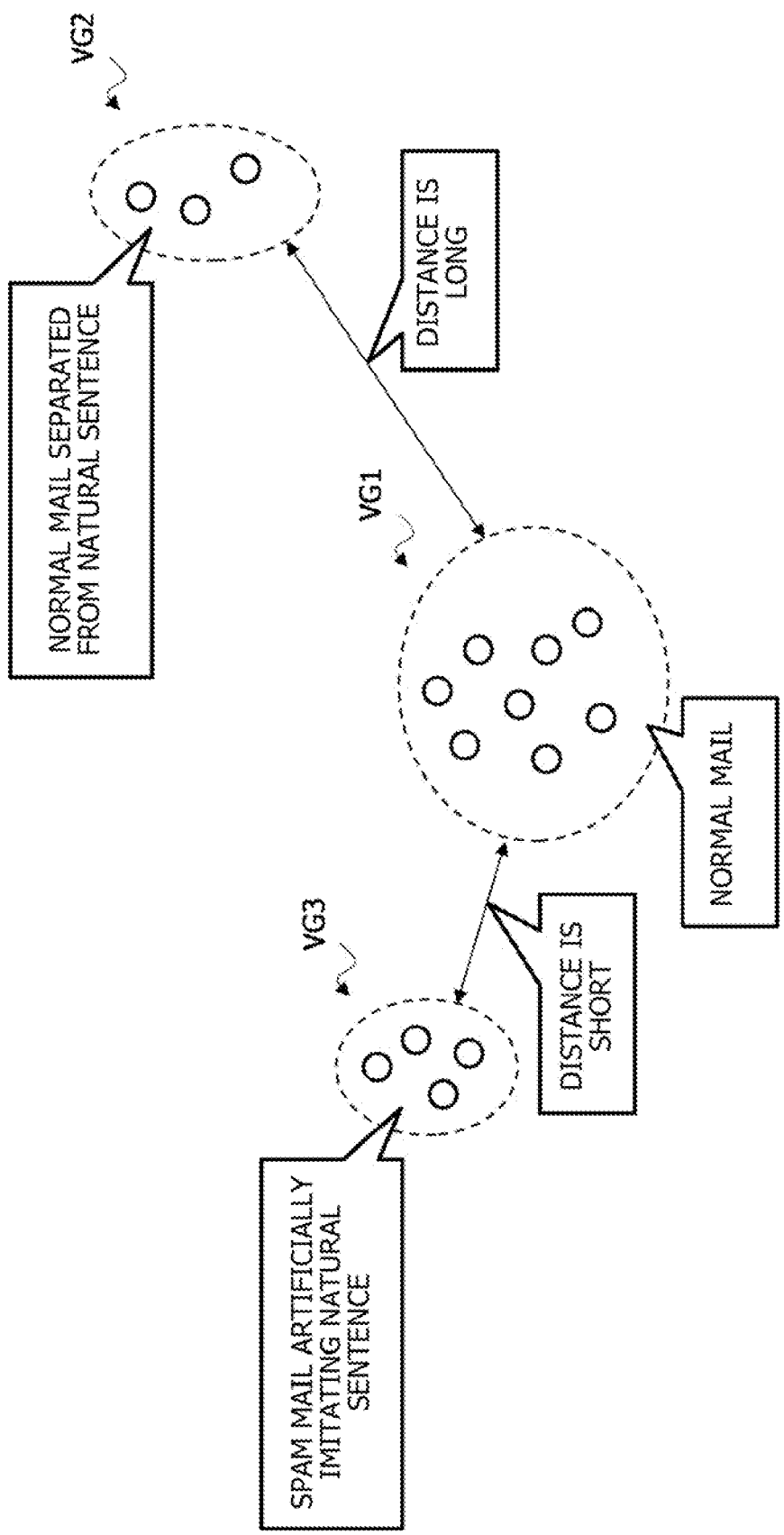
FIG. 4 is a diagram for explaining a specific example of the abnormality detection by the determination model.

FIGS. 3 and 4 are diagrams for explaining a specific example of the abnormality detection by the determination model. Note that, hereinafter, a case will be described where a determination model that detects a spam mail from among a plurality of mails received from outside is used.

The example illustrated in FIG. 3 illustrates a state where each feature vector corresponding to the training data 131 trained at the training stage (respective feature vectors included in vector groups VG1, VG2, and VG3) is distributed in the feature space.

Specifically, a mail corresponding to each feature vector included in the vector group VG2 is, for example, a mail described in an expression separated from a natural sentence, and a mail corresponding to each feature vector included in the vector group VG3 is, for example, a mail described in a natural sentence. Therefore, in this case, as illustrated in FIG. 3, the determination model distributes each feature vector included in the vector group VG2 at a position away from each feature vector included in the vector group VG1 (each feature vector corresponding to normal mail) and distributes each feature vector included in the vector group VG3 at a position close to each feature vector corresponding to the normal mail.

However, in a case where training described above is performed, as illustrated in FIG. 4, for example, there is a possibility that the determination model cannot detect a spam mail described in an example imitating a natural sentence as a mail in the abnormal state. Furthermore, in this case, for example, there is a possibility that the determination model detects the normal mail described in the expression separated from the natural sentence as the mail in the abnormal state. In other words, there is a possibility that the determination model that has performed training as described above cannot necessarily detect the determination target data in the abnormal state that is implicitly desired by the user.

Therefore, for example, the user performs active training for giving feedback to the training data 131 at the training stage (determination model verification stage). Specifically, for example, the user manually adds a label indicating whether the data is data in the abnormal state, on the training data 131 determined to be in the abnormal state of the training data 131 input into the determination model. Then, the user performs supervised training using the labeled training data 131.

As a result, for example, the user can notice existence of the abnormal state that is implicitly desired by the user in a labeling process and can generate a determination model that can detect the data in the abnormal state that is implicitly desired by the user.

However, in a case where the active training described above is performed, the user needs to comprehensively grasp the abnormal state of the data needed to be detected, in advance. Therefore, for example, in a case where the user does not fully understand the abnormal state of the data, it is not possible for the user to perform the active training as described above. Furthermore, in a case where the determination model determines that the data in the abnormal state as the data in the normal state, the user cannot detect such data.

Figure 5:
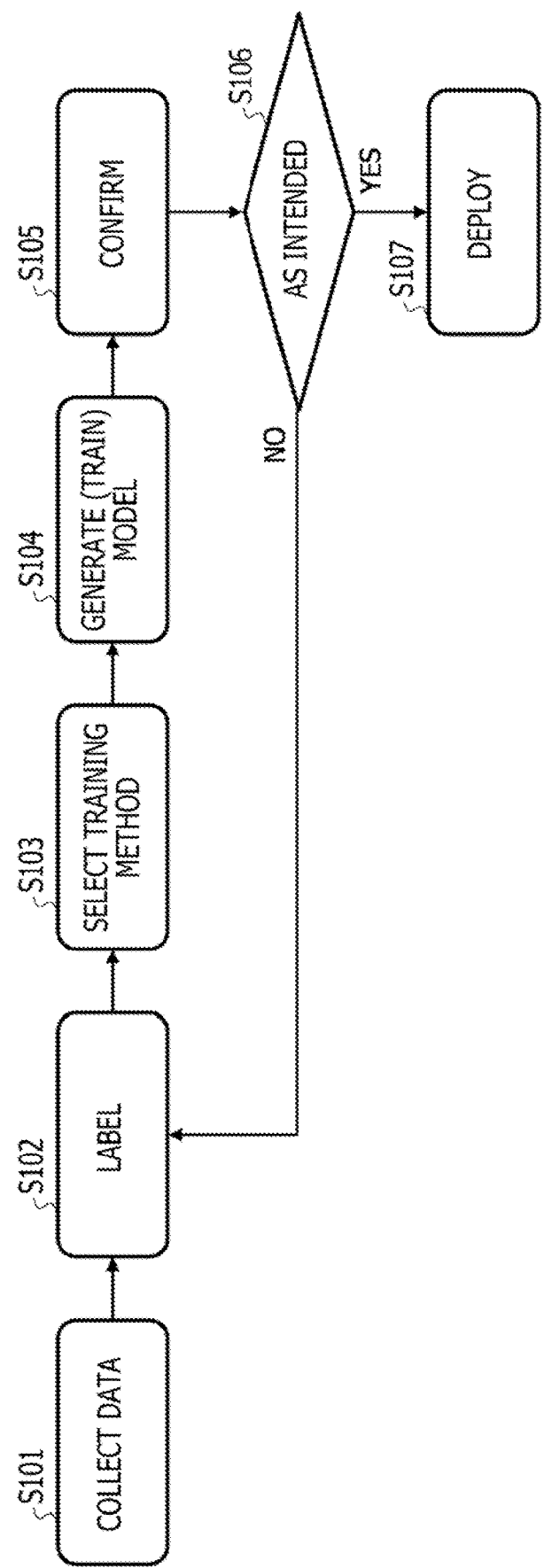
FIG. 5 is a diagram for explaining a specific example of processing at the determination model training stage.

Moreover, in a case where determination accuracy or the like of the determination model does not meet a criteria due to reasons such as inappropriate design by a creator at the training stage or the like, as illustrated in FIG. 5, there is a case where the user needs to perform each work including labeling again due to necessity for regenerating the determination model and man-hours of the user become more enormous (No in S106, S102, or the like).

Therefore, at the training stage, the information processing device 1 according to the present embodiment calculates a deviation degree of a feature of a training dataset of each piece of the training data 131 included in the training dataset, using the determination model that is generated through training using the plurality of pieces of the training data 131 (hereinafter, referred to as training dataset) to which a label is not added.

Then, the information processing device 1 selects and outputs one or more pieces of the training data 131 included in the training dataset or related data related to the data of the one or more pieces of the training data 131 included in the training dataset, on the basis of the deviation degree. Thereafter, the information processing device 1 receives an input of a determination result by the user for the one or more pieces of the output training data 131. Subsequently, the information processing device 1 determines an adjustment standard used to adjust each feature of the training data 131 included in the training dataset on the basis of the received determination result.

Thereafter, the information processing device 1 makes a determination regarding the determination target data after adjusting the feature of the determination target data according to the adjustment standard at the inference stage.

In other words, for example, the information processing device 1 receives an input of only the determination result corresponding to partial training data 131 included in the training data 131 from the user and determines the adjustment standard used to adjust the features of all the pieces of the training data 131 included in the training dataset by using the received determination result. Specifically, for example, the information processing device 1 determines a matrix for performing coordinate conversion of the feature vector of each piece of the training data 131 in the feature space as the adjustment standard, on the basis of the determination result.

As a result, the information processing device 1 can suppress the man-hours of the user needed for labeling, and in addition, can generate the determination model that can detect the data in the abnormal state that is implicitly desired by the user.

[Hardware Configuration of Information Processing System]

Figure 6:
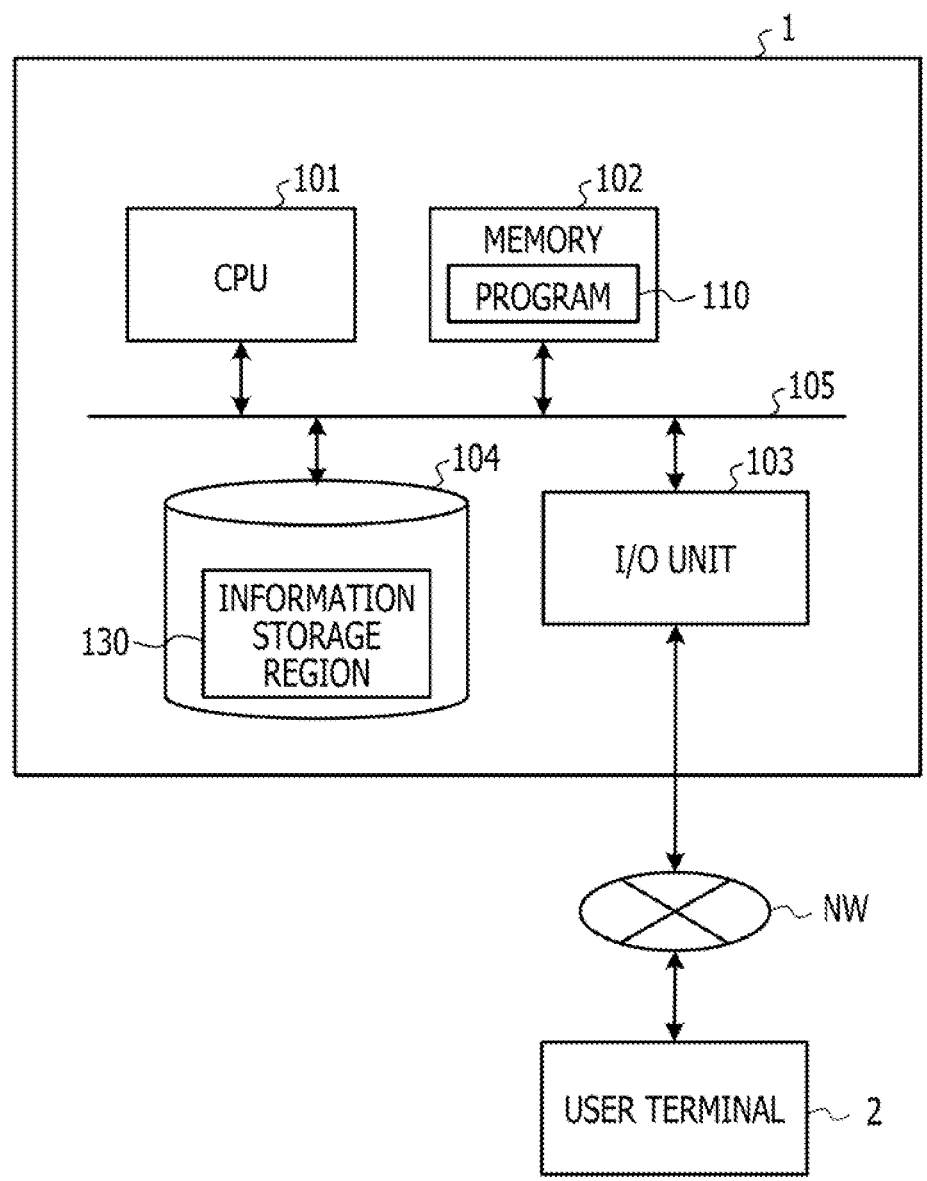
FIG. 6 is a diagram for explaining a hardware configuration of an information processing device 1.

Next, a hardware configuration of the information processing system 10 will be described. FIG. 6 is a diagram for explaining a hardware configuration of the information processing device 1.

As illustrated in FIG. 6, the information processing device 1 includes a CPU 101 that is a processor, a memory 102, an external interface (I/O unit) 103, and a storage medium 104. The units are connected to each other via a bus 105.

The storage medium 104 includes, for example, a program storage region (not illustrated) that stores a program 110 for executing processing for generating and adjusting the determination model (hereinafter, simply referred to as training processing). Furthermore, the storage medium 104 includes, for example, the information storage region 130 that stores information used when the training processing is executed. Note that the storage medium 104 may be, for example, a hard disk drive (HDD) or a solid state drive (SSD).

The CPU 101 executes the program 110 loaded from the storage medium 104 into the memory 102 and executes the training processing.

The external interface 103 communicates with the user terminal 2 via the network NW, for example.

[Functions of Information Processing System]

Figure 7:
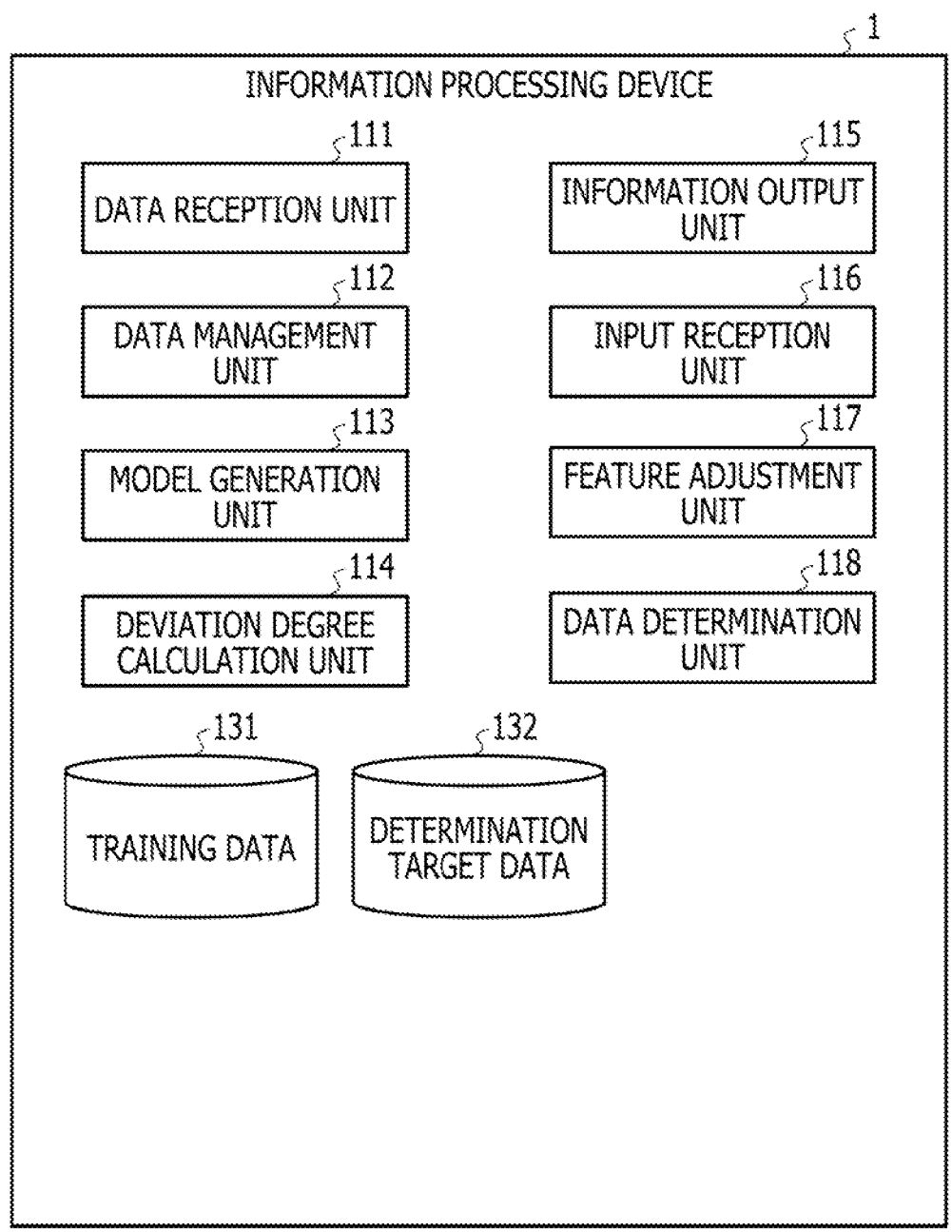
FIG. 7 is a block diagram of functions of the information processing device 1.

Next, functions of the information processing system 10 will be described. FIG. 7 is a block diagram of functions of the information processing device 1.

As illustrated in FIG. 7, the hardware such as the CPU 101 or the memory 102 of the information processing device 1 and the program 110 organically cooperate so that the information processing device 1 realizes various functions including a data reception unit 111, a data management unit 112, a model generation unit 113, a deviation degree calculation unit 114, an information output unit 115, an input reception unit 116, a feature adjustment unit 117, and a data determination unit 118.

Furthermore, as illustrated in FIG. 7, the information processing device 1 stores the training data 131 and determination target data 132 in the information storage region 130.

First, functions at the training stage will be described.

The data reception unit 111 receives, for example, a training dataset including a plurality of pieces of the training data 131 from the user terminal 2. Specifically, the data reception unit 111 receives, for example, the training dataset including the plurality of pieces of the training data 131 to which a label is not added. Then, the data management unit 112 stores the training dataset received by the data reception unit 111 in the information storage region 130.

The model generation unit 113 generates the determination model by using the plurality of pieces of the training data 131 included in the training dataset stored in the information storage region 130.

The deviation degree calculation unit 114 calculates a deviation degree of a feature in the training dataset of each piece of the training data 131 included in the training dataset stored in the information storage region 130, by using the determination model generated by the model generation unit 113.

The information output unit 115 selects one or more pieces of the training data 131 included in the training dataset on the basis of the deviation degree calculated by the deviation degree calculation unit 114. Specifically, the information output unit 115 selects one or more pieces of the training data 131 in a descending order of the deviation degree calculated by the deviation degree calculation unit 114, for example. Then, the information output unit 115 outputs, for example, the one or more pieces of selected training data 131 to the user terminal 2.

The input reception unit 116 receives an input of a determination result by a user for the one or more pieces of data output by the information output unit 115. Specifically, the input reception unit 116, for example, receives the determination result input by the user via the user terminal 2.

More specifically, the input reception unit 116 receives, for example, an input of a determination result indicating which one of data that is in an abnormal state and has high priority (hereinafter, referred to as first data), data that is in an abnormal state and has low priority (hereinafter, referred to as second data), and data in a normal state (hereinafter, referred to as third data), each of the one or more pieces of data output by the information output unit 115 is.

The feature adjustment unit 117 determines an adjustment standard used to adjust the feature of each piece of the training data 131 included in the training dataset stored in the information storage region 130, on the basis of the determination result received by the input reception unit 116. Specifically, in a case where the feature vectors corresponding to the respective pieces of the training data 131 included in the training data stored in the information storage region 130 are distributed in the feature space, the feature adjustment unit 117 determines a matrix for performing the coordinate conversion of the feature vector of each piece of the training data 131 in the feature space as the adjustment standard.

More specifically, the feature adjustment unit 117 determines the adjustment standard used to adjust the feature of each piece of the training data 131 included in the training dataset, so as to decrease the deviation degree corresponding to each piece of the training data 131 that indicates that the determination result received by the input reception unit 116 is the first data, for example.

Next, functions at the inference stage will be described.

The data reception unit 111 receives, for example, the determination target data 132 used to make a determination by the determination model from the user terminal 2. Then, the data management unit 112 stores, for example, the determination target data 132 received by the data reception unit 111 in the information storage region 130.

The data determination unit 118 inputs the determination target data 132 received by the data reception unit 111 into the determination model generated by the model generation unit 113. In this case, the determination model adjusts a feature extracted from the determination target data 132 received by the data reception unit 111 using the adjustment standard determined by the feature adjustment unit 117. Then, the determination model makes a determination regarding the determination target data 132 received by the data reception unit 111, by using the adjusted feature. Specifically, the determination model determines, for example, whether or not the determination target data 132 received by the data reception unit 111 is data in the abnormal state.

The information output unit 115 outputs the determination result made by the data determination unit 118 (for example, determination result regarding whether or not determination target data 132 is data in abnormal state) to the user terminal 2, for example.

Outline of First Embodiment

Figure 8:
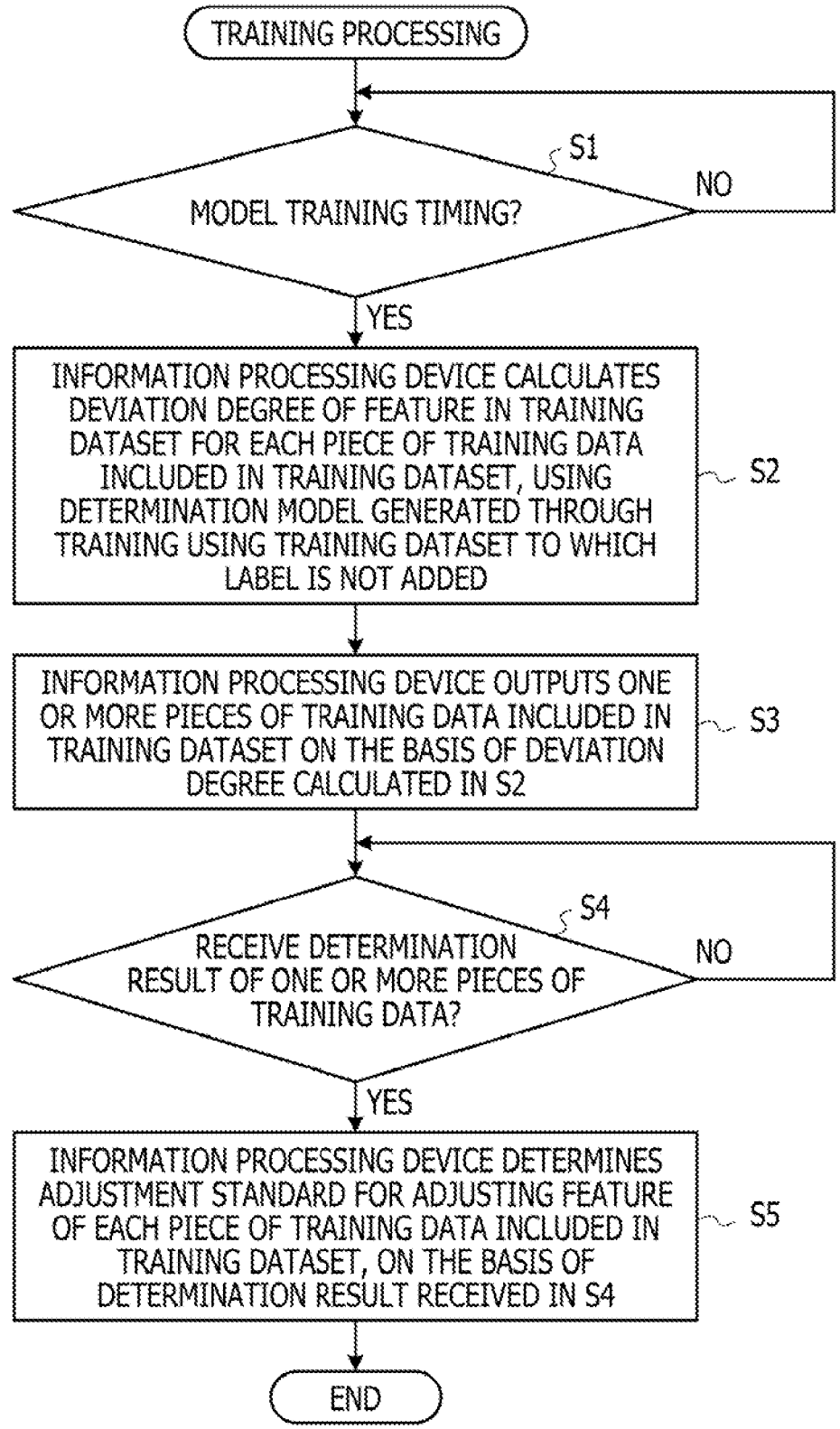
FIG. 8 is a flowchart for explaining an outline of training processing according to a first embodiment.
Figure 9:
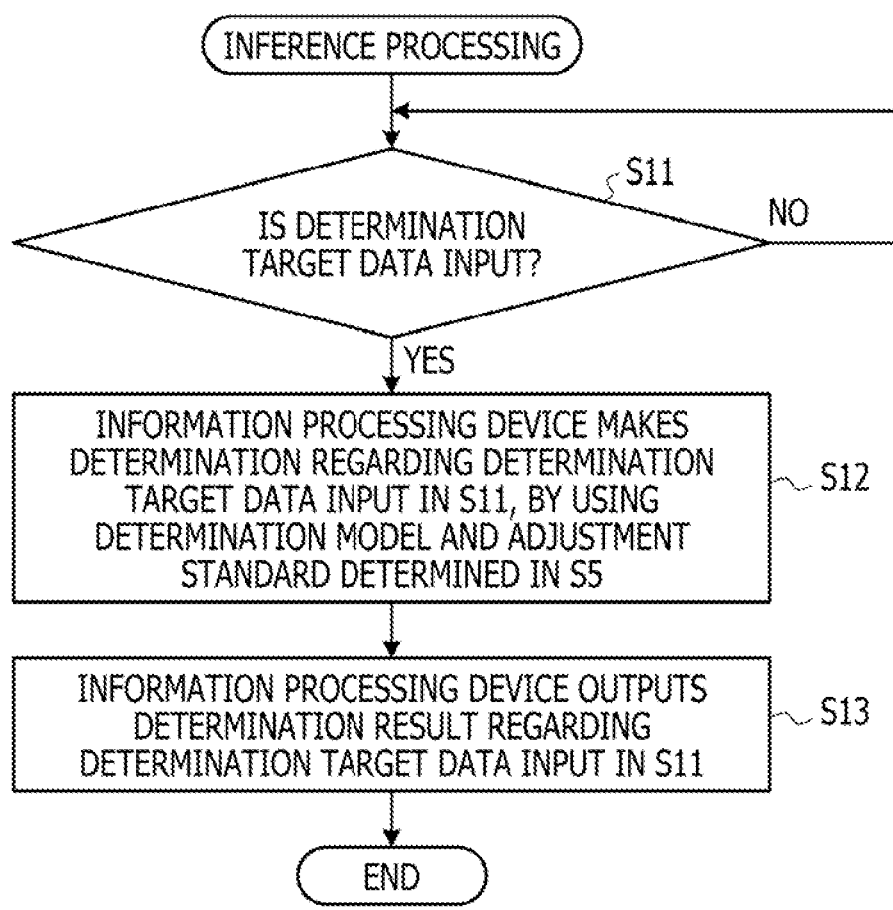
FIG. 9 is a flowchart for explaining an outline of inference processing according to the first embodiment.
Figure 10:
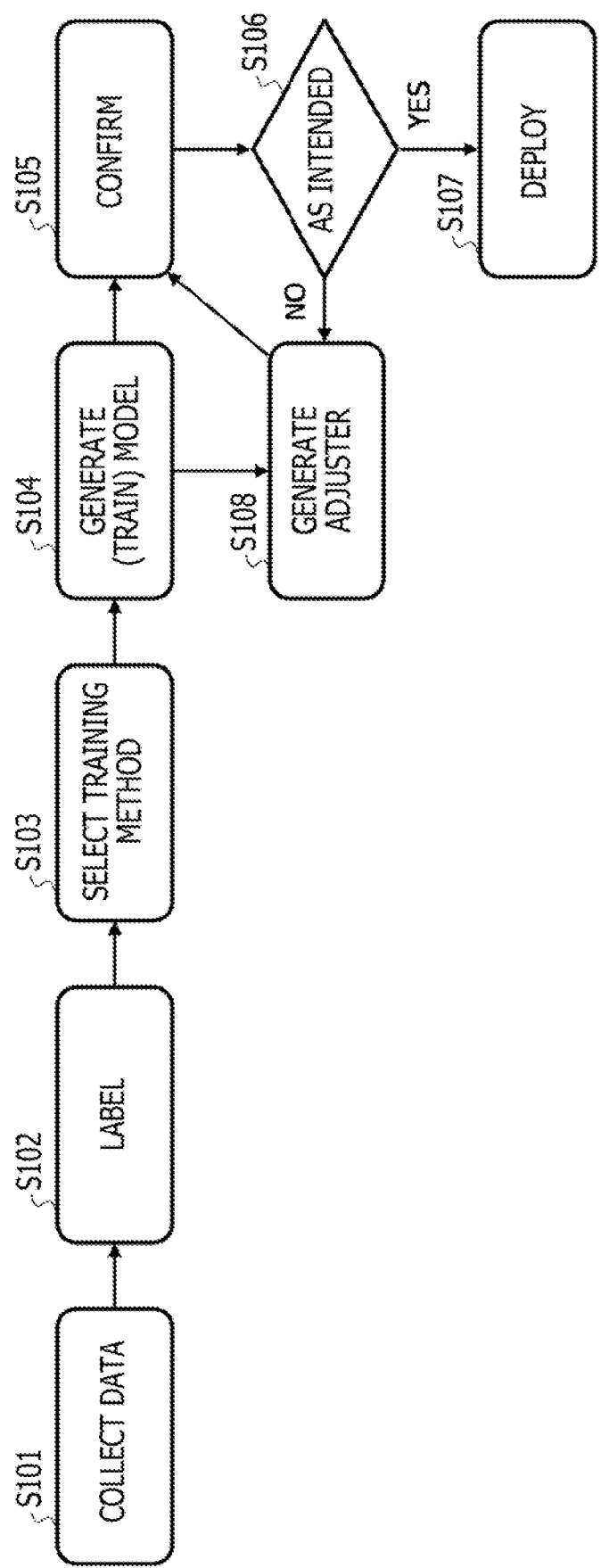
FIG. 10 is a diagram for explaining an outline of the training processing according to the first embodiment.

Next, an outline of a first embodiment will be described. FIG. 8 is a flowchart for explaining an outline of the training processing according to the first embodiment. Furthermore, FIG. 9 is a flowchart for explaining an outline of the inference processing according to the first embodiment. Moreover, FIG. 10 is a diagram for explaining the outline of the training processing according to the first embodiment.

First, the outline of the training processing according to the first embodiment will be described.

As illustrated in FIG. 8, the information processing device 1 waits, for example, until a model training timing comes (NO in S1). The model training timing may be, for example, a timing when the user inputs information indicating that training of the determination model is performed via the user terminal 2.

Then, in a case where the model training timing comes (YES in S1), the information processing device 1 calculates a deviation degree of a feature in a training dataset for each piece of the training data 131 included in the training dataset, using the determination model generated through training using the training dataset to which a label is not added (S2).

Subsequently, the information processing device 1 selects one or more pieces of data included in the training dataset on the basis of the deviation degree calculated in the processing in S2 and outputs the data (S3).

Thereafter, the information processing device 1 waits until an input of a determination result by a user for the one or more pieces of data output in the processing in S3 is received (NO in S4).

Then, in a case where the input of the determination result by the user for the one or more pieces of data output in the processing in S3 is received (YES in S4), the information processing device 1 determines an adjustment standard used to adjust the feature of each piece of the training data 131 included in the training dataset, on the basis of the received determination result (S5).

Next, the outline of the inference processing according to the first embodiment will be described.

As illustrated in FIG. 9, the information processing device 1 waits until the user inputs the determination target data 132 via the user terminal 2, for example (No in S11).

Then, in a case where the determination target data 132 is input (YES in S11), the information processing device 1 makes a determination regarding the determination target data 132 input in the processing in S11, by using the determination model and the adjustment standard determined in the processing in S5 (S12).

Thereafter, the information processing device 1 outputs a determination result regarding the determination target data 132 input in the processing in S11 (S13).

In other words, the information processing device 1 according to the present embodiment receives an input of only the determination result corresponding to partial training data 131 included in the training data 131 from the user at the training stage (determination model verification stage) and adjusts the features of all the pieces of the training data 131 included in the training dataset by using the received determination result. Specifically, as illustrated in FIG. 10, the information processing device 1 generates an adjuster that performs coordinate conversion on a feature vector of each piece of the training data 131 in the feature space as one of the functions included in the determination model (S108).

Then, the information processing device 1 determines whether or not the determination target data 132 is data in the abnormal state by using the determination model including the adjuster, at the inference stage.

As a result, the information processing device 1 can generate the determination model that can also detect the data in the abnormal state that has been implicitly desired by the user, while suppressing the man-hours of the user needed for labeling.

Furthermore, in a case of generating the adjuster as described above, the information processing device 1 according to the present embodiment does not need to regenerate the generated determination model.

As a result, the user can suppress man-hours needed for regeneration of the determination model, in addition to the man-hours needed for labeling of the training data 131. Hereinafter, a specific example of the coordinate conversion of the feature vector by the adjuster will be described.

Specific Example of Coordinate Conversion of Feature Vector by Adjuster

Figure 11:
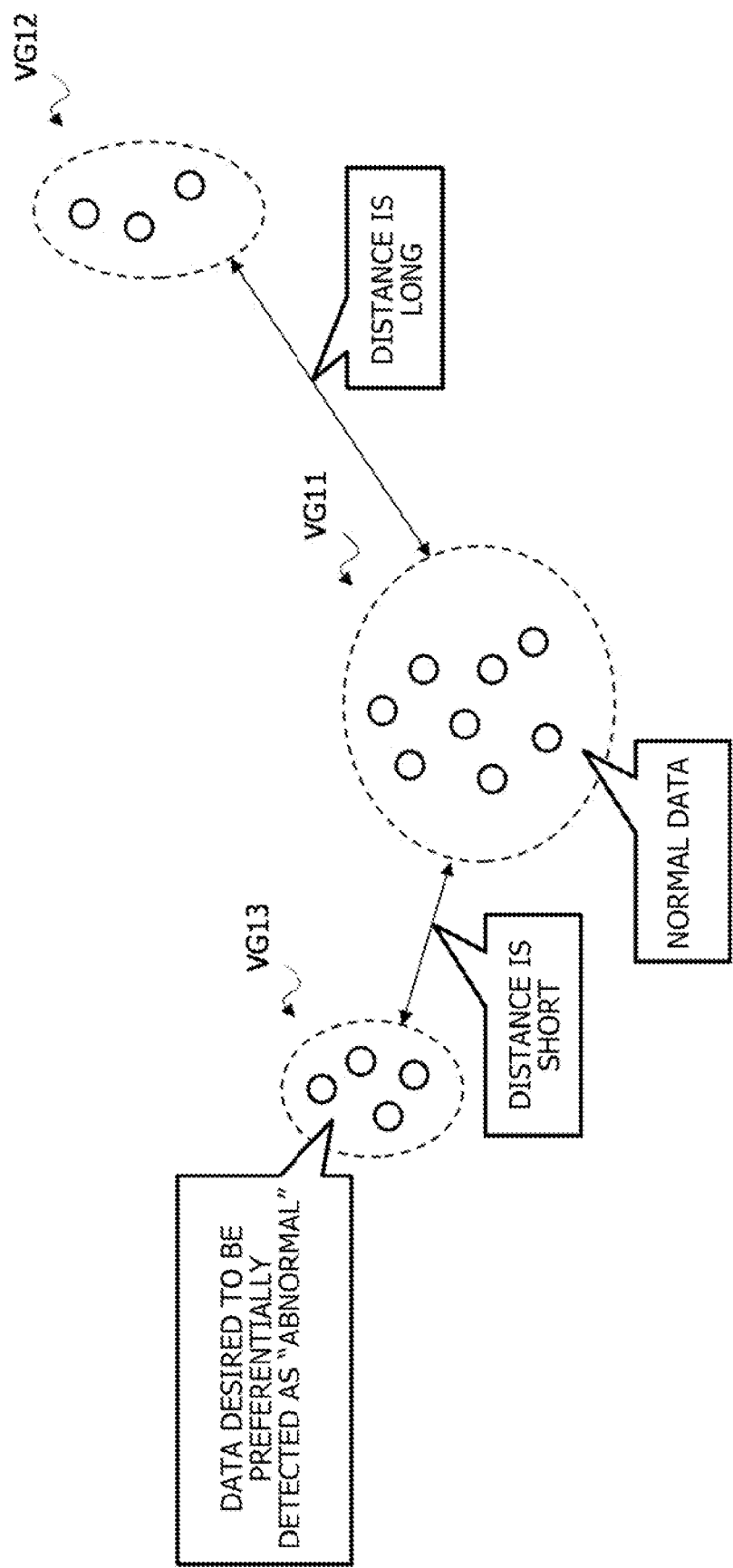
FIG. 11 is a diagram for explaining a specific example of coordinate conversion of a feature vector by an adjuster.
Figure 12:
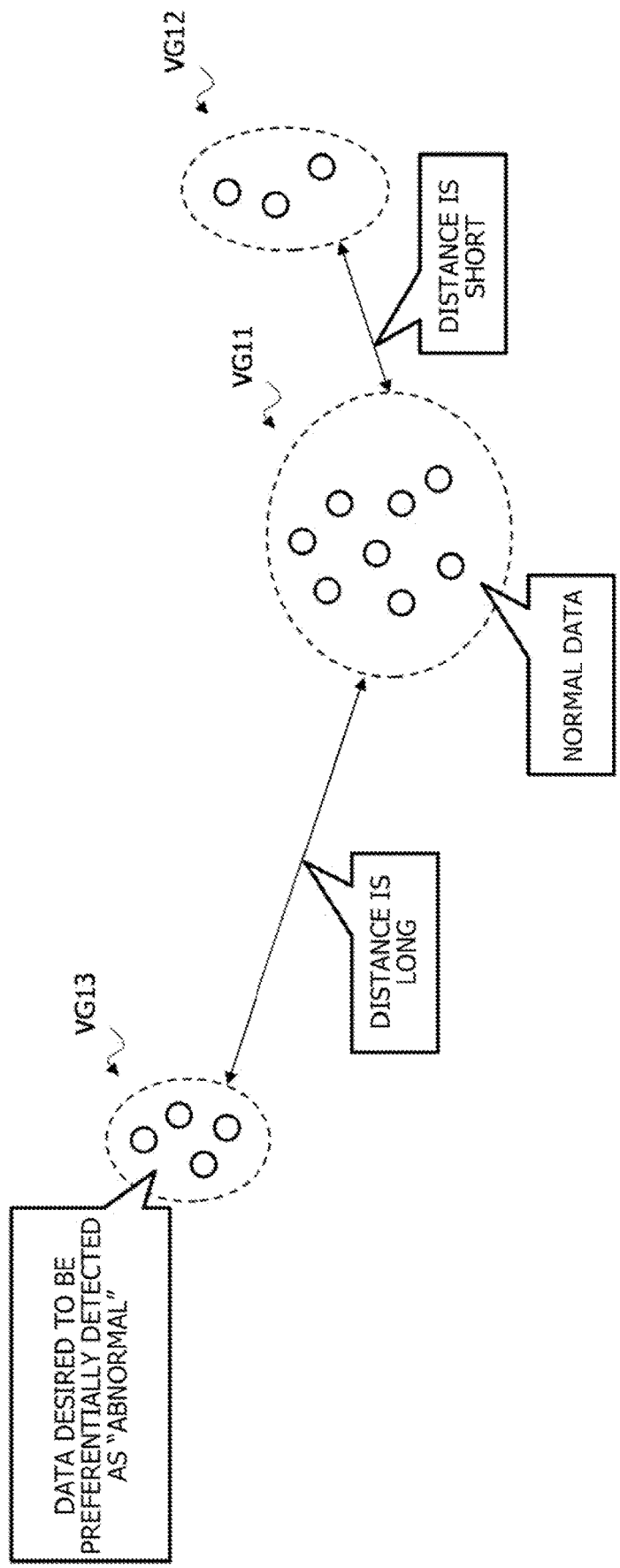
FIG. 12 is a diagram for explaining a specific example of the coordinate conversion of the feature vector by the adjuster.
Figure 13:
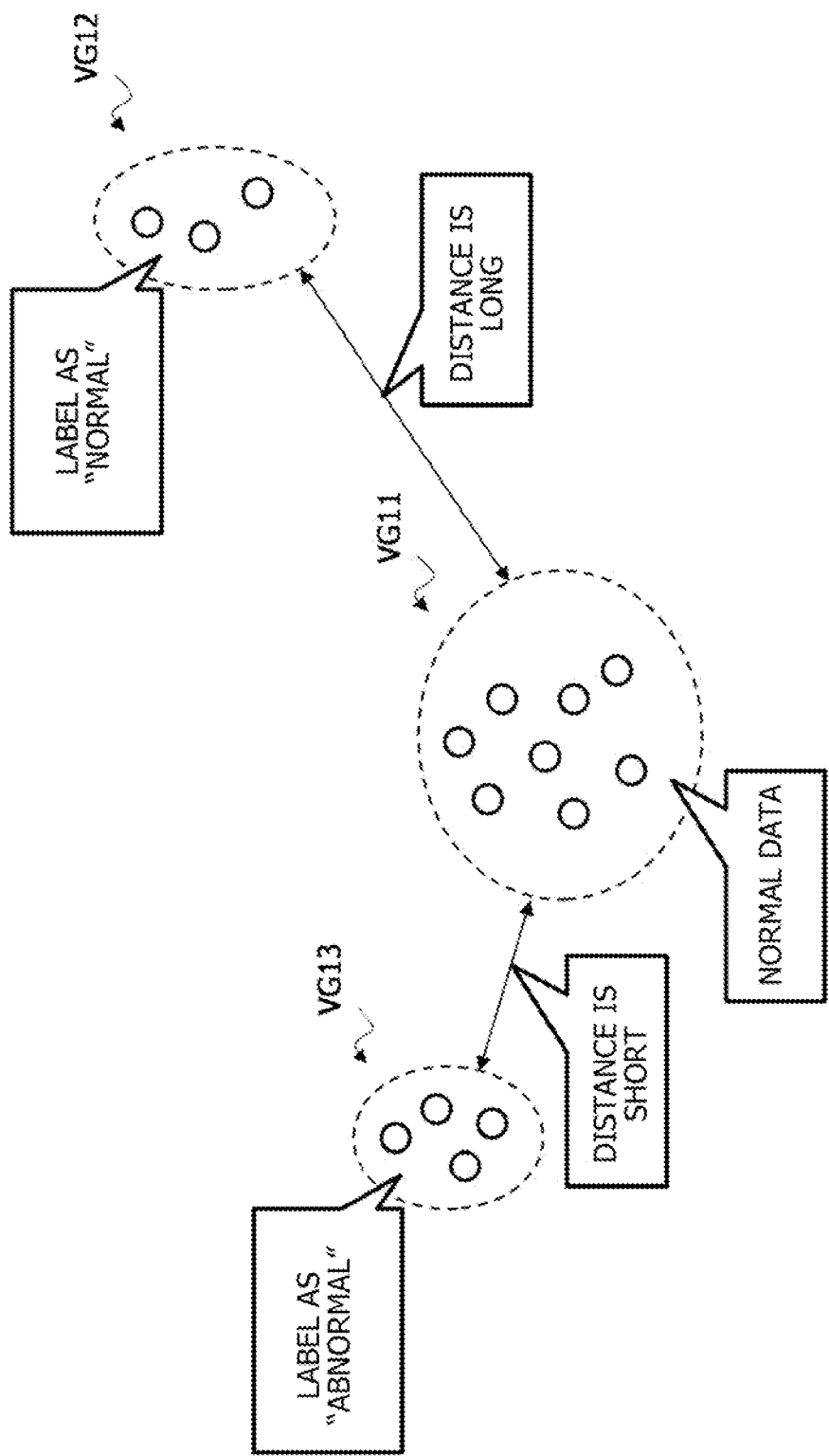
FIG. 13 is a diagram for explaining a specific example of the coordinate conversion of the feature vector by the adjuster.

FIGS. 11 to 13 are diagrams for explaining the specific example of the coordinate conversion of the feature vector by the adjuster. Hereinafter, description will be made while assuming that both of the training data 131 in the normal state and the training data 131 in the abnormal state be trained at the training stage.

The example illustrated in FIG. 11 illustrates a state where each feature vector (each feature vector included in vector group VG11) corresponding to the training data 131 in the normal state is distributed in the feature space. Furthermore, the example illustrated in FIG. 11 illustrates a state where each feature vector corresponding to the training data 131 in the abnormal state (each feature vector included in each of vector groups VG12 and VG13) is distributed in the feature space. Then, in the example illustrated in FIG. 11, each feature vector included in the vector group V13 is distributed at a position closer to each feature vector included in the vector group V11 than each feature vector included in the vector group V12.

Here, for example, in a case where the determination result, of which the input from the user is received in the processing in S4, indicates that it is desired to detect that the determination target data 132 corresponding to the feature vector included in the vector group VG13 is more abnormal than the determination target data 132 corresponding to the feature vector included in the vector group VG12, the information processing device 1, as illustrated in FIG. 12, generates the adjuster that performs coordinate conversion for causing a distance between each feature vector included in the vector group V11 and each feature vector included in the vector group V13 to be longer than a distance between each feature vector included in the vector group V11 and each feature vector included in the vector group V12.

As a result, for example, as illustrated in FIG. 13, by using the adjuster, the user can generate the determination model that detects that the determination target data 132 corresponding to the feature vector included in the vector group VG13 is more abnormal than the determination target data 132 corresponding to the feature vector included in the vector group VG12 without labeling each feature vector included in the vector groups VG12 and VG13.

Details of First Embodiment

Figure 14:
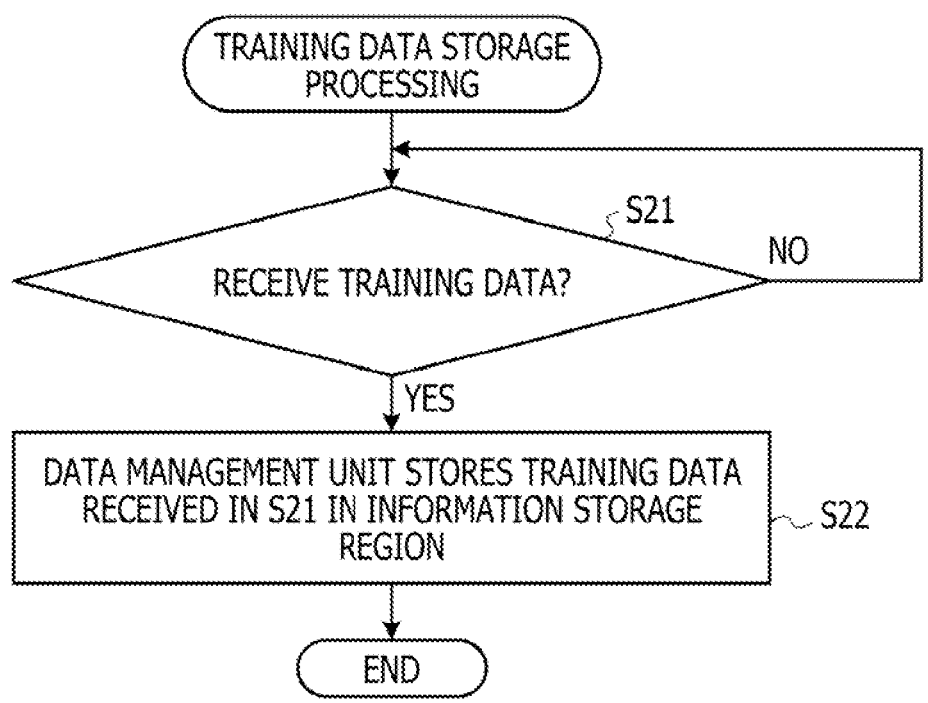
FIG. 14 is a flowchart for explaining details of the training processing according to the first embodiment.
Figure 15:
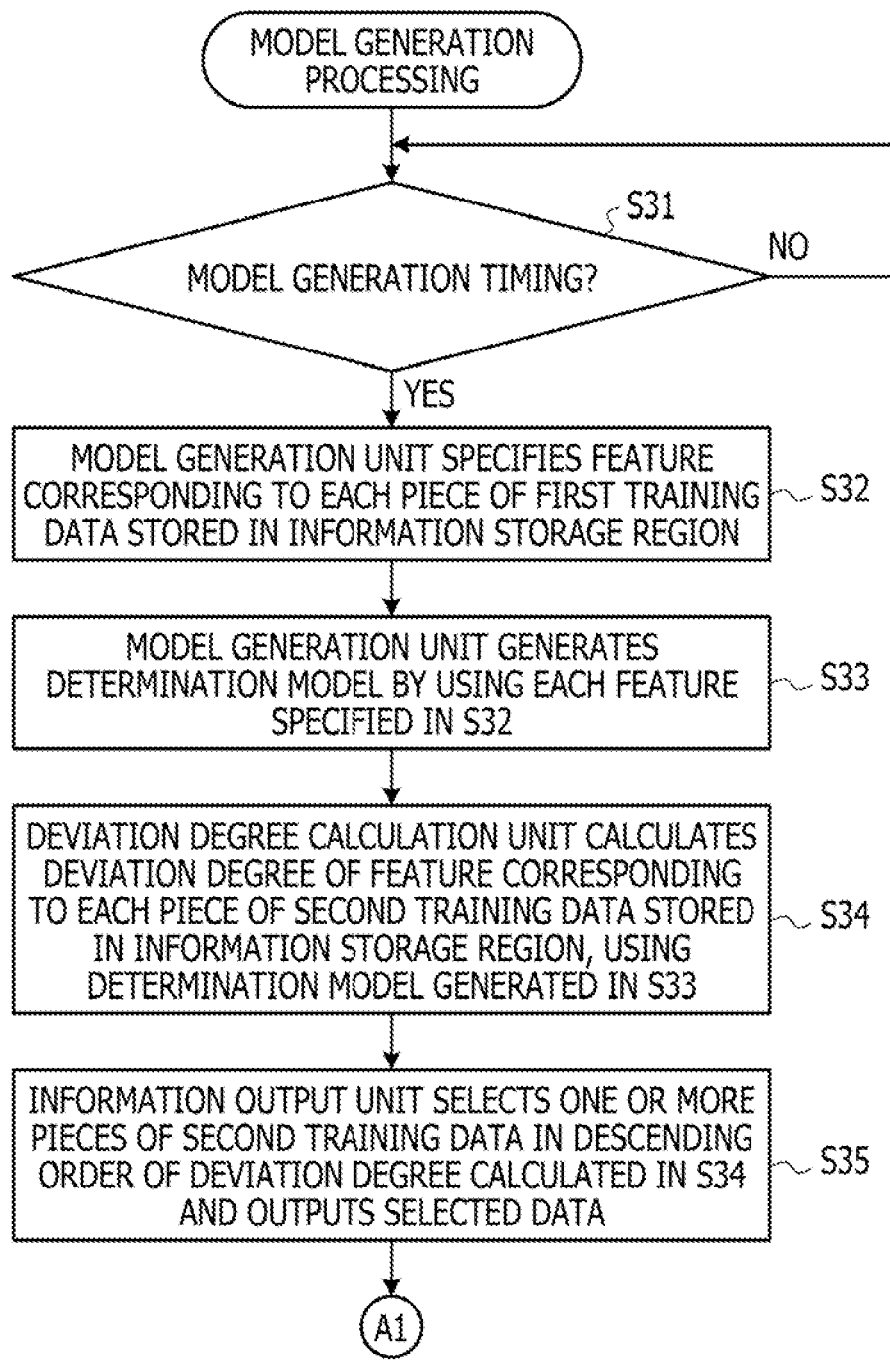
FIG. 15 is a flowchart for explaining the details of the training processing according to the first embodiment.
Figure 16:
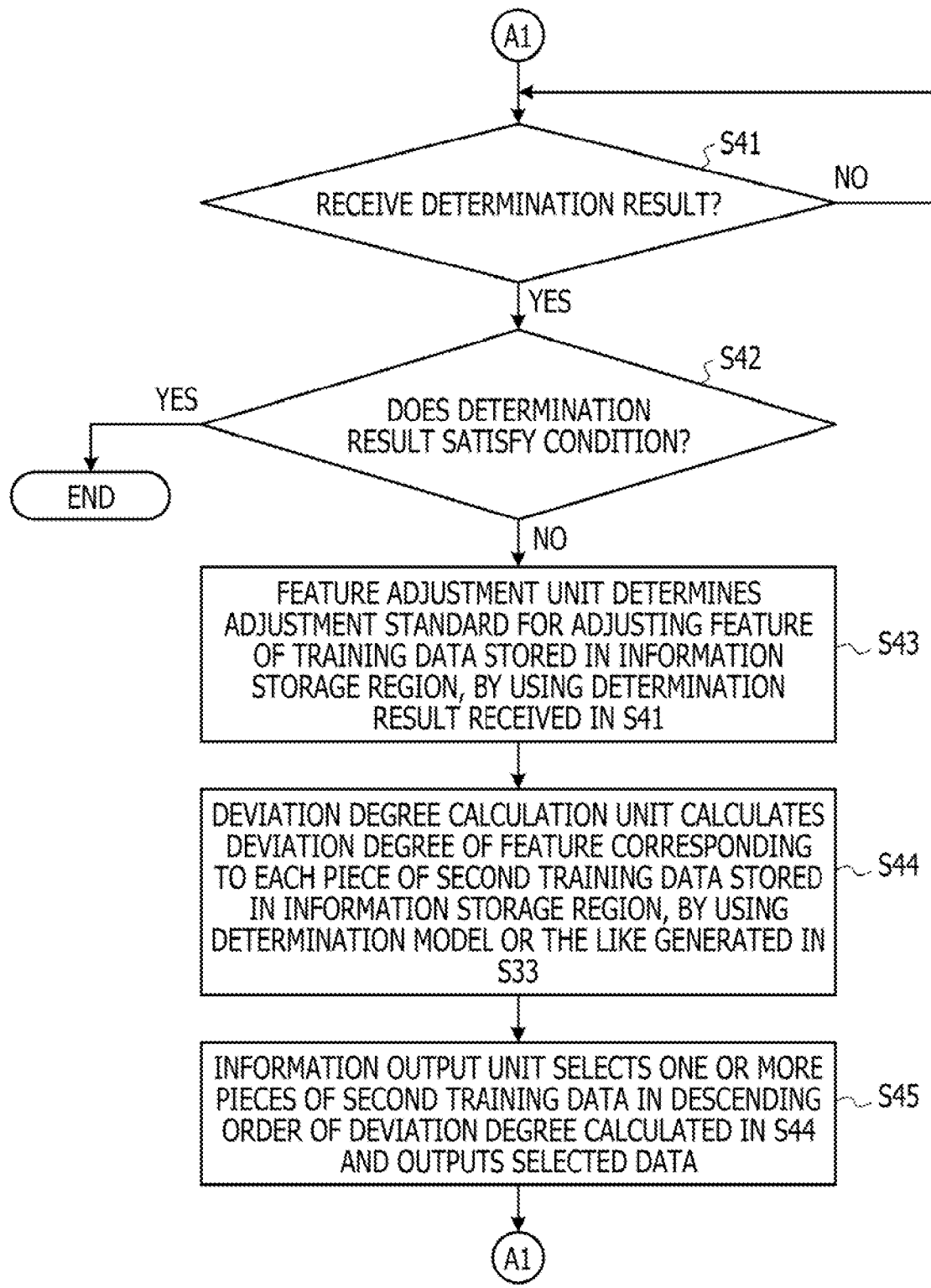
FIG. 16 is a flowchart for explaining the details of the training processing according to the first embodiment.
Figure 17:
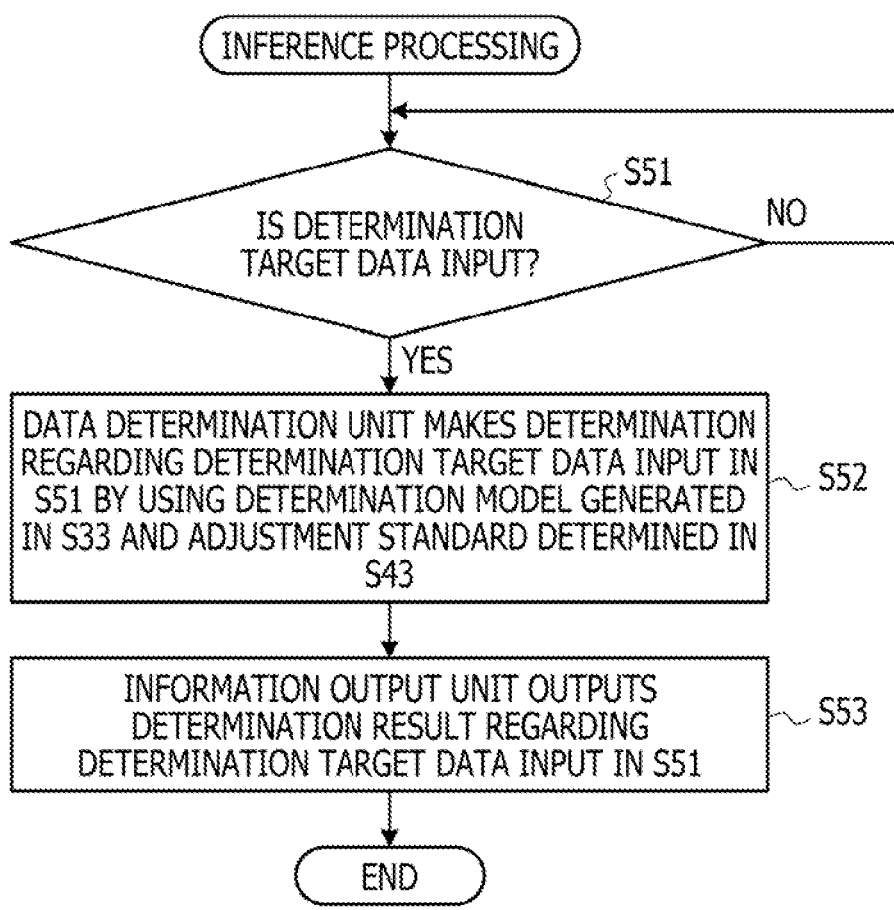
FIG. 17 is a flowchart for explaining details of the inference processing according to the first embodiment.
Figure 18:
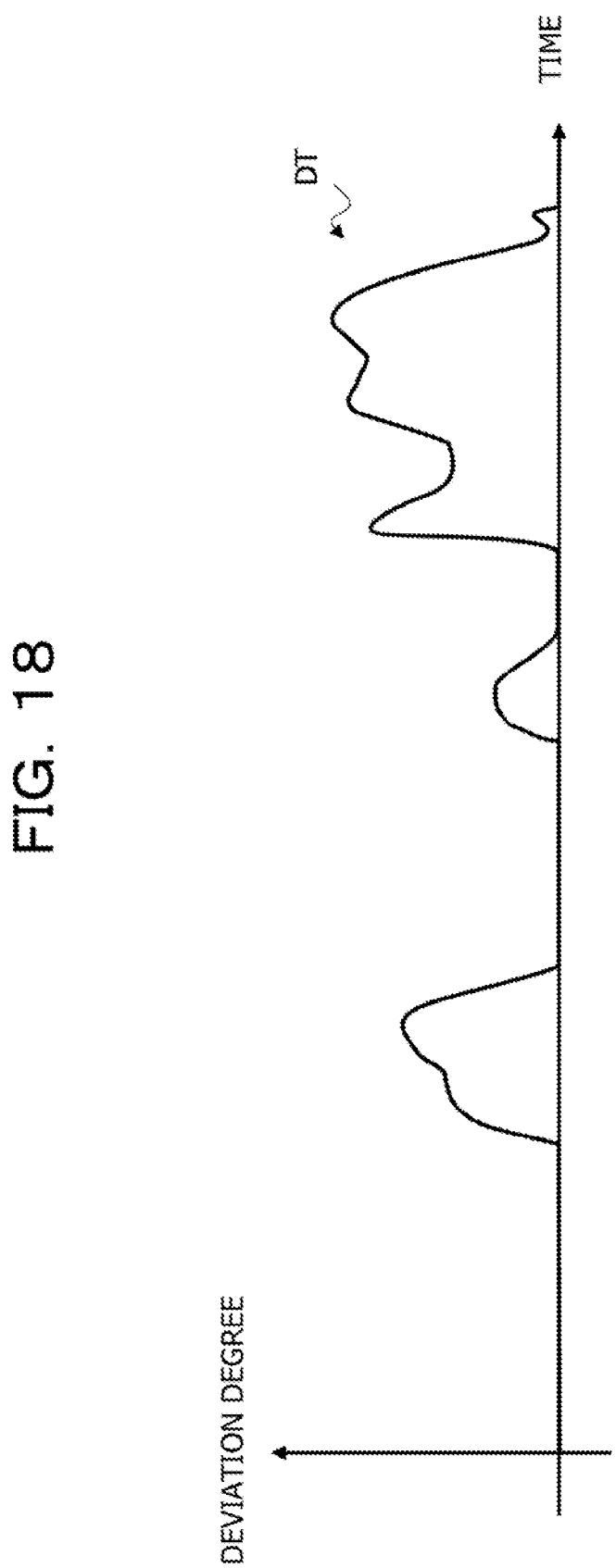
FIG. 18 is a diagram for explaining the details of the training processing according to the first embodiment.
Figure 19:
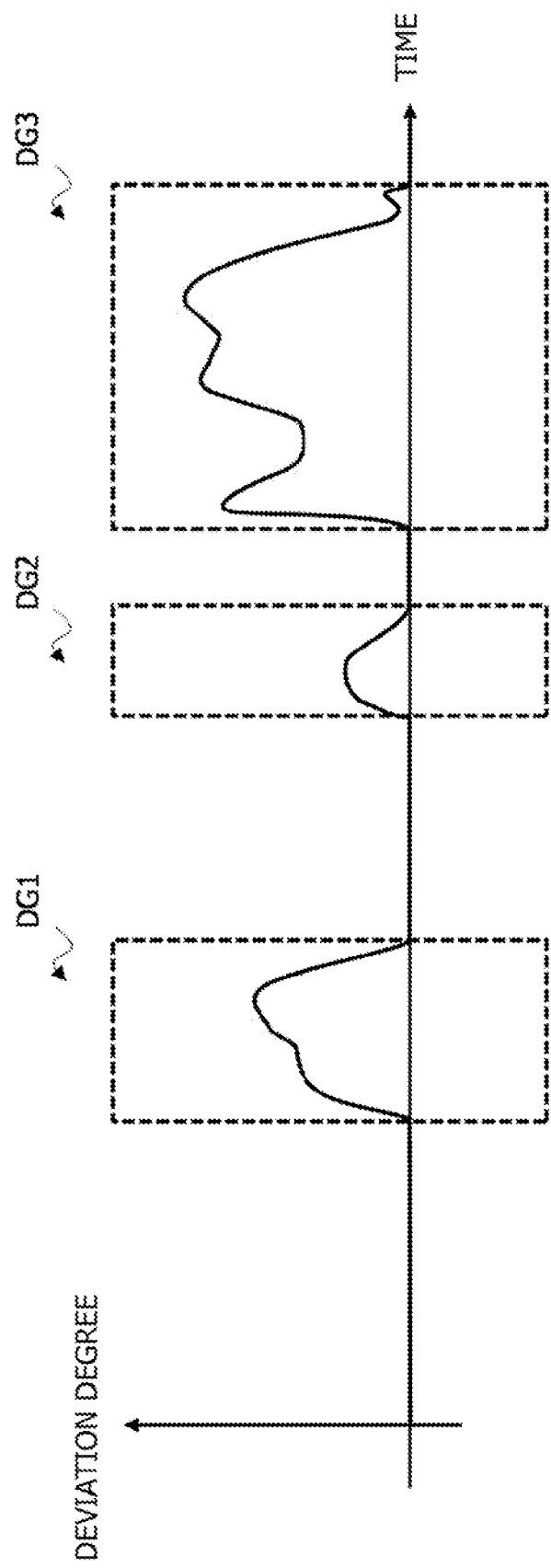
FIG. 19 is a diagram for explaining the details of the training processing according to the first embodiment.
Figure 20:
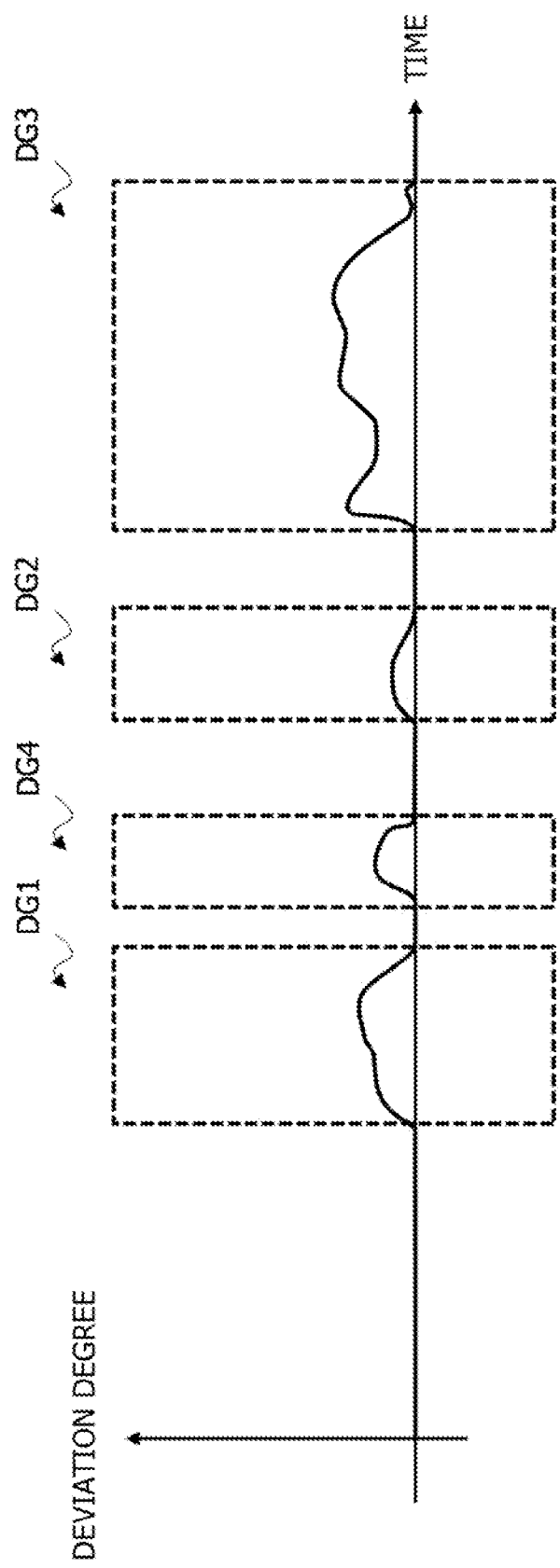
FIG. 20 is a diagram for explaining the details of the training processing according to the first embodiment.

Next, details of the first embodiment will be described. FIGS. 14 to 16 are flowcharts for explaining details of the training processing according to the first embodiment. Furthermore, FIG. 17 is a flowchart for explaining details of the inference processing according to the first embodiment. Moreover, FIGS. 18 to 20 are diagrams for explaining details of the training processing according to the first embodiment.

[Training Data Storage Processing]

First, processing for storing the training data 131 (hereinafter, referred to as training data storage processing) of the training processing according to the first embodiment will be described. FIG. 14 is a flowchart for explaining the training data storage processing according to the first embodiment.

The data reception unit 111 of the information processing device 1 waits, for example, until the training data 131 (training data 131 included in training dataset) is received from the user terminal 2 (NO in S21).

Then, for example, in a case where a training dataset including a plurality of pieces of the training data 131 is received (YES in S21), the data management unit 112 of the information processing device 1 stores the training data 131 received in the processing in S21 in the information storage region 130 (S22).

[Model Generation Processing]

Next, processing for generating the determination model (hereinafter, referred to as model generation processing) of the training processing according to the first embodiment will be described. FIG. 15 is a flowchart for explaining the model generation processing according to the first embodiment.

As illustrated in FIG. 15, the model generation unit 113 of the information processing device 1 waits until a model generation timing comes (NO in S31). The model generation timing may be, for example, a timing when the user inputs information indicating that the generation of the determination model is started via the user terminal 2.

Then, in a case where the model generation timing comes (YES in S31), the model generation unit 113 specifies a feature corresponding to each piece of partial training data 131 (hereinafter, referred to as first training data 131a) stored in the information storage region 130 (S32). The first training data 131a may be, for example, training data 131 that is determined to be in the normal state by the user.

Thereafter, the model generation unit 113 generates a determination model using each feature specified in the processing in S32 (S33).

Next, the deviation degree calculation unit 114 of the information processing device 1 calculates a deviation degree of the feature corresponding to each piece of the partial training data 131 (hereinafter, referred to as second training data 131b) stored in the information storage region 130, using the determination model generated in the processing in S33 (S24). The second training data 131b may be, for example, training data 131 that is different from the first training data 131a and is determined to be in the abnormal state by the user. Furthermore, the second training data 131b may be, for example, training data 131 different from the first training data 131a and include both of the training data 131 determined to be in the abnormal state by the user and the training data 131 determined to be in the normal state.

Specifically, the deviation degree calculation unit 114 calculates a deviation degree of a feature corresponding to each piece of the second training data 131b from a value output from the determination model in response to an input of each piece of the second training data 131b. In other words, the deviation degree calculation unit 114 calculates a value indicating a deviation state of the feature vector with respect to another second training data 131b in the feature space as a deviation degree, for each piece of the second training data 131b. Hereinafter, a specific example of the deviation degree of the feature corresponding to each piece of the training data 131 will be described.

Specific Example of Deviation Degree of Feature Corresponding to Each Piece of Training Data FIG. 18 is a diagram for explaining the specific example of the deviation degree of the feature corresponding to each piece of the training data 131. In the graph illustrated in FIG. 18, the horizontal axis corresponds to time, and the vertical axis corresponds to a deviation degree of a feature of training data 131 (training data 131 acquired at each time) corresponding to each time. Note that, in the example illustrated in FIG. 18, for example, time-series data for each minute corresponds to each piece of the training data 131.

Specifically, in the example illustrated in FIG. 18, for example, training data 131 of which a deviation degree is zero indicates data in the normal state. On the other hand, for example, training data 131 of which a deviation degree is not zero indicates data in the abnormal state.

Returning to FIG. 15, the information output unit 115 of the information processing device 1 selects one or more pieces of the second training data 131b in a descending order of the deviation degree calculated in the processing in S34 and outputs the selected second training data 131b (S35).

Specifically, the information output unit 115 outputs, for example, the one or more pieces of the second training data 131b itself to the user terminal 2. Furthermore, the information output unit 115 outputs, for example, related data indicating content of at least some of the one or more pieces of the second training data 131b to the user terminal 2. Hereinafter, a specific example of the processing in S35 will be described.

Specific Example of Processing in S35

FIG. 19 is a specific example for explaining the specific example of the processing in S35.

The graph illustrated in FIG. 19 indicates that data sets DG1, DG2, and DG3 exist as sets of the training data 131 of which the deviation degree of the feature is not zero.

Then, the information output unit 115 selects, for example, the data set DG3 of which an average value of the deviation degree at each time is the largest from among the data sets DG1, DG2, and DG3 and outputs the data set DG3.

Returning to FIG. 16, the input reception unit 116 of the information processing device 1 waits until the input of the determination result by the user for the one or more pieces of the second training data 131b output from the information output unit 115 is received (NO in S41).

Specifically, the input reception unit 116 receives an input of a determination result indicating which one of the first data that is data in the abnormal state and has high priority, the second data that is data in the abnormal state and has low priority, and the third data in the normal state each one of the one or more pieces of the second training data 131b output by the information output unit 115 corresponds.

Note that, in this case, in a case of detecting existence of the second training data 131b corresponding to a new abnormality, the user may determine the second training data 131b as the first data. Furthermore, in this case, the user may input scores of an abnormality degree and priority for each of the one or more pieces of the second training data 131b output by the information output unit 115.

Then, in a case of receiving the input of the determination result by the user for the one or more pieces of the second training data 131b (YES in S41), the feature adjustment unit 117 of the information processing device 1 determines whether or not the determination result for the one or more pieces of the second training data 131b satisfies a predetermined condition (S42).

Specifically, the feature adjustment unit 117 determines, for example, whether or not the number or a ratio of the second training data 131b determined as the first data, from among the one or more pieces of the second training data 131b, is equal to or more than a threshold.

As a result, in a case where it is determined that the determination result for the one or more pieces of the second training data 131b does not satisfy the predetermined condition (NO in S42), the feature adjustment unit 117 determines an adjustment standard used to adjust the feature of the training data 131 (first training data 131a and second training data 131b) stored in the information storage region 130, by using the determination result received in the processing in S31 (S43).

Specifically, the feature adjustment unit 117 performs, for example, distance training regarding the training data 131 stored in the information storage region 130, by using the determination result received in the processing in S31. Then, the feature adjustment unit 117 determines the adjustment standard so that each feature of the training data 131 stored in the information storage region 130 follows a training result of the distance training. Hereinafter, a specific example of the processing in S43 will be described.

Specific Example of Processing in S43

First, a specific example of the distance training regarding the training data 131 will be described.

The feature adjustment unit 117 performs, for example, the distance training so that a distance between each of the first and second data and the third data is longer. Furthermore, the feature adjustment unit 117 performs, for example, the distance training so that a distance between the first and third data is longer than a distance between the second and third data. Moreover, the feature adjustment unit 117 performs, for example, the distance training so that a distance between different pieces of the third data is shortened.

Specifically, the feature adjustment unit 117 performs, for example, the distance training by solving optimization problems indicated in the following formulas (1) to (4).

$$\text{maximize} \sum_{\substack{i \in N, \\ j \in A_- \cup A_+}} (x_i - x_j)^\top M(x_i - x_j) \qquad \text{[Formula 1]}$$

$$\text{subject to} \sum_{i,j \in N} (x_i - x_j)^\top M(x_i - x_j) \leq \alpha \qquad \text{[Formula 2]}$$

-continued $$\max_{i \in N, j \in A_-} (x_i - x_j)^\top M(x_i - x_j) + \beta \leq \min_{i \in N, j \in A_+} (x_i - x_j)^\top M(x_i - x_j) \quad \text{[Formula 3]}$$

$$M \succeq O \quad \text{[Formula 4]}$$

The formula (1) described above is a formula indicating that the distance between each of the first and second data and the third data is longer, the formula (2) is a formula indicating that the distance between the different pieces of the third data is shortened (to cause the distance between the different pieces of the third data to be equal to or less than the threshold), the formula (3) is a formula indicating that the distance between the first and third data is longer than the distance between the second and third data, and the formula (4) is a formula indicating that a matrix M is a positive-semidefinite matrix.

Note that, in the formulas (1) to (4) described above, $X_i$ indicates an i-th piece of the training data 131, $X_j$ indicates a j-th piece of the training data 131, N indicates a set of the third data of the training data 131, $A_+$ indicates a set of the first data of the training data 131, $A_-$ indicates a set of the second data of the training data 131, and M indicates the matrix M corresponding to the adjustment standard.

Subsequently, the feature adjustment unit 117 decomposes the matrix M that is an optimum solution of the optimization problems indicated in the formulas (1) to (4) as in the following formula (5).

$$M = L^\top L \quad \text{[Formula 5]}$$

Thereafter, the feature adjustment unit 117 performs the coordinate conversion of the feature vector corresponding to each piece of the training data 131 in the feature space by following the following formula (6).

$$x_i \leftarrow L x_i \quad \text{[Formula 6]}$$

Specifically, for example, as illustrated in FIG. 20, the feature adjustment unit 117 performs the coordinate conversion of the feature vector corresponding to each piece of the training data 131 described in FIG. 19.

As a result, the feature adjustment unit 117 can suppress the deviation degree of the feature corresponding to each piece of the second training data 131b.

Note that, the example illustrated in FIG. 20 indicates that, while the deviation degree of the feature corresponding to each of the data sets DG1, DG2, and DG3 is suppressed, a deviation degree of a feature corresponding to a data set DG4 increases.

Returning to FIG. 16, the deviation degree calculation unit 114 calculates the deviation degree of the feature corresponding to each piece of the second training data 131b stored in the information storage region 130, using the determination model generated in the processing in S33 and the adjustment standard determined in the processing in S43 (S44).

Then, the information output unit 115 selects the one or more pieces of the second training data 131b in a descending order of the deviation degree calculated in the processing in S44 and outputs the second training data 131b (S45). Thereafter, the input reception unit 116 executes the processing in and subsequent to S41.

On the other hand, in a case where it is determined that the determination result for the one or more pieces of the second training data 131b satisfies the predetermined condition (YES in S42), the information processing device 1 ends the training processing.

[Inference Processing]

Next, the inference processing according to the first embodiment will be described. FIG. 17 is a flowchart for explaining the inference processing according to the first embodiment.

As illustrated in FIG. 17, the data reception unit 111 waits, for example, until the user inputs the determination target data 132 via the user terminal 2 (NO in S51).

Then, in a case where the determination target data 132 is input (YES in S51), the data determination unit 118 of the information processing device 1 makes a determination regarding the determination target data 132 input in the processing in S51, by using the determination model generated in the processing in S33 and the adjustment standard determined in the processing in S43 (S52).

Specifically, the determination model adjusts the feature extracted from the determination target data 132 input in the processing in S51 by using the adjustment standard determined in the processing in S43. In other words, in this case, the determination model performs the coordinate conversion by using the adjustment standard (matrix) determined in the processing in S43 for the feature vector corresponding to the determination target data 132 in the feature space. Then, the determination model determines whether or not the determination target data 132 input in the processing in S51 is data in the abnormal state, by using the adjusted feature.

Note that, in a case where a plurality of adjustment standards (matrix) is generated by executing the processing in S43 a plurality of times, the feature extracted from the determination target data 132 input in the processing in S51 is adjusted by using all the adjustment standards determined in the processing in S43.

Returning to FIG. 17, the information output unit 115 outputs a determination result regarding the determination target data 132 input in the processing in S51 (S53).

As described above, the information processing device 1 according to the present embodiment calculates the deviation degree of the feature of the training dataset of each piece of the training data 131 included in the training dataset at the training stage, using the determination model that is generated through training using the plurality of pieces of training data 131 (training dataset) to which a label is not added.

Then, the information processing device 1 selects and outputs one or more pieces of the training data 131 included in the training dataset or related data related to the data of the one or more pieces of the training data 131 included in the training dataset, on the basis of the deviation degree. Thereafter, the information processing device 1 receives an input of a determination result by the user for the one or more pieces of the output training data 131. Subsequently, the information processing device 1 determines an adjustment standard used to adjust each feature of the training data 131 included in the training dataset on the basis of the received determination result.

Thereafter, the information processing device 1 makes a determination regarding the determination target data 132 after adjusting the feature of the determination target data according to the adjustment standard at the inference stage.

In other words, the information processing device 1 according to the present embodiment receives an input of only the determination result corresponding to partial training data 131 included in the training data 131 from the user at the training stage (determination model verification stage) and adjusts the features of all the pieces of the training data 131 included in the training dataset by using the received determination result. Specifically, the information processing device 1 generates the adjustment standard (adjuster) that performs the coordinate conversion of the feature vector of each piece of the training data 131 in the feature space as one of the functions included in the determination model.

Then, the information processing device 1 determines whether or not the determination target data 132 is data in the abnormal state by using the determination model including the adjuster, at the inference stage.

As a result, the information processing device 1 can generate the determination model that can also detect the data in the abnormal state that has been implicitly desired by the user, while suppressing the man-hours of the user needed for labeling.

Furthermore, in a case of generating the adjuster as described above, the information processing device 1 according to the present embodiment does not need to regenerate the generated determination model.

As a result, the user can suppress man-hours needed for regeneration of the determination model, in addition to the man-hours needed for labeling of the training data 131.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory computer-readable storage medium storing a training processing program that causes at least one computer to execute a process, the process comprising:
    acquiring a deviation degree of a feature in a training dataset for each piece of data included in the training dataset, by using a determination model that is generated through training by using the training dataset, the training dataset being unlabeled;
    selecting one or more pieces of data included in the training dataset based on the deviation degree;
        outputting the selected one or more pieces of data or related data related to the selected one or more pieces of data;
        receiving an input of a determination result by a user for the one or more pieces of data; and
        determining an adjustment standard used to adjust a feature of each piece of the data included in the training dataset based on the received determination result, wherein
        when determination target data is determined by the determination model, a feature of the determination target data is adjusted based on the adjustment standard, and
    the process further comprises:
    receiving an input of the determination target data;
    adjusting a feature that corresponds to the determination target data by using the adjustment standard;
    determining regarding the determination target data based on output from the determination model in response to the input of the adjusted feature into the determination model; and
    outputting a determination result regarding the determination target data.

2. The non-transitory computer-readable storage medium according to claim 1, wherein
    the acquiring includes acquiring, for each piece of the data included in the training dataset, a value that indicates a deviation state of a feature vector to a feature vector of other piece of data included in the training dataset in a feature space as the deviation degree.

3. The non-transitory computer-readable storage medium according to claim 1, wherein
    the selecting includes selecting one or more pieces of data in a descending order of the deviation degree from the data included in the training dataset.

4. The non-transitory computer-readable storage medium according to claim 1, wherein
    the receiving includes receiving an input of a determination result that indicates each of the one or more pieces of data is one selected from first data that is data in an abnormal state and has high priority, second data that is data in an abnormal state and has low priority, and third data in a normal state.

5. The non-transitory computer-readable storage medium according to claim 4, wherein
    the determining includes determining an adjustment standard used to adjust a feature of each piece of the data included in the training dataset so as to decrease the deviation degree that corresponds to the first data among the one or more pieces of data.

6. The non-transitory computer-readable storage medium according to claim 4, wherein the determining includes:
    performing distance training on the one or more pieces of data by using the determination result, and
    determining the adjustment standard so that a feature of each of the one or more pieces of data follows a training result of the distance training.

7. The non-transitory computer-readable storage medium according to claim 6, wherein
    the determining includes performing the distance training on the one or more pieces of data so that a distance between the third data and each of the first and second data is longer, a distance between the first data and the third data is longer than a distance between the second data and the third data, and a distance between different pieces of the third data is shortened.

8. The non-transitory computer-readable storage medium according to claim 6, wherein
    the determining includes determining a matrix used for coordinate conversion of a feature vector that corresponds to each of the first data and the second data in the feature space as the adjustment standard.

9. The non-transitory computer-readable storage medium according to claim 4, wherein
    the acquiring, the selecting, the receiving, and the determining are executed until the number or a ratio of pieces of the first data included in the one or more pieces of data is equal to or more than a threshold.

10. An information processing device comprising:
    one or more memories; and
    one or more processors coupled to the one or more memories and the one or more processors configured to:
        acquire a deviation degree of a feature in a training dataset for each piece of data included in the training dataset, by using a determination model that is generated through training by using the training dataset, the training dataset being unlabeled,
        select one or more pieces of data included in the training dataset based on the deviation degree, output the selected one or more pieces of data or related data related to the selected one or more pieces of data, receive an input of a determination result by a user for the one or more pieces of data, and determine an adjustment standard used to adjust a feature of each piece of the data included in the training dataset based on the received determination result, wherein when determination target data is determined by the determination model, a feature of the determination target data is adjusted based on the adjustment standard, and the one or more processors are further configured to:

receive an input of the determination target data;

adjust a feature that corresponds to the determination target data by using the adjustment standard;

determine regarding the determination target data based on output from the determination model in response to the input of the adjusted feature into the determination model; and output a determination result regarding the determination target data.

11. The information processing device according to claim 10, wherein the one or more processors are further configured to acquire, for each piece of the data included in the training dataset, a value that indicates a deviation state of a feature vector to a feature vector of other piece of data included in the training dataset in a feature space as the deviation degree.

12. The information processing device according to claim 10, the one or more processors are further configured to select one or more pieces of data in a descending order of the deviation degree from the data included in the training dataset.

13. The information processing device according to claim 10, wherein the one or more processors are further configured to receive an input of a determination result that indicates each of the one or more pieces of data is one selected from first data that is data in an abnormal state and has high priority, second data that is data in an abnormal state and has low priority, and third data in a normal state.

14. A training processing method for a computer to execute a process comprising:

acquiring a deviation degree of a feature in a training dataset for each piece of data included in the training dataset, by using a determination model that is generated through training by using the training dataset, the training dataset being unlabeled;

selecting one or more pieces of data included in the training dataset based on the deviation degree;

outputting the selected one or more pieces of data or related data related to the selected one or more pieces of data;

receiving an input of a determination result by a user for the one or more pieces of data; and determining an adjustment standard used to adjust a feature of each piece of the data included in the training dataset based on the received determination result, wherein when determination target data is determined by the determination model, a feature of the determination target data is adjusted based on the adjustment standard, and the process further comprises:

receiving an input of the determination target data;

adjusting a feature that corresponds to the determination target data by using the adjustment standard;

determining regarding the determination target data based on output from the determination model in response to the input of the adjusted feature into the determination model; and outputting a determination result regarding the determination target data.

15. The training processing method according to claim 14, wherein the acquiring includes acquiring, for each piece of the data included in the training dataset, a value that indicates a deviation state of a feature vector to a feature vector of other piece of data included in the training dataset in a feature space as the deviation degree.

16. The training processing method according to claim 14, wherein the selecting includes selecting one or more pieces of data in a descending order of the deviation degree from the data included in the training dataset.

17. The training processing method according to claim 14, wherein the receiving includes receiving an input of a determination result that indicates each of the one or more pieces of data is one selected from first data that is data in an abnormal state and has high priority, second data that is data in an abnormal state and has low priority, and third data in a normal state.

* * * * *